(12) United States Patent
Weaver et al.

(10) Patent No.: US 9,018,140 B2
(45) Date of Patent: Apr. 28, 2015

(54) METHODS FOR STABILIZING WATER-SENSITIVE CLAYS

(75) Inventors: Jimmie D. Weaver, Duncan, OK (US); Philip D. Nguyen, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 603 days.

(21) Appl. No.: 13/474,868

(22) Filed: May 18, 2012

(65) Prior Publication Data

US 2013/0310284 A1 Nov. 21, 2013

(51) Int. Cl.
*C09K 8/68* (2006.01)
*C09K 8/12* (2006.01)

(52) U.S. Cl.
CPC ... *C09K 8/12* (2013.01); *C09K 8/68* (2013.01); *C09K 2208/12* (2013.01)

(58) Field of Classification Search
None
See application file for complete search history.

(56) References Cited

U.S. PATENT DOCUMENTS

| | | | |
|---|---|---|---|
| 4,366,074 A | 12/1982 | McLaughlin et al. | |
| 4,460,627 A | 7/1984 | Weaver et al. | |
| 4,532,052 A | 7/1985 | Weaver et al. | |
| 5,646,093 A | 7/1997 | Dino | |
| 7,207,387 B2 | 4/2007 | Eoff et al. | |
| 7,398,825 B2 | 7/2008 | Nguyen et al. | |
| 7,493,957 B2 | 2/2009 | Nguyen et al. | |
| 7,678,742 B2 | 3/2010 | Munoz, Jr. et al. | |
| 7,678,743 B2 | 3/2010 | Munoz, Jr. et al. | |
| 7,687,438 B2 | 3/2010 | Munoz, Jr. et al. | |
| 7,730,950 B2 | 6/2010 | Nguyen et al. | |
| 7,956,016 B2 | 6/2011 | Panga et al. | |
| 7,998,910 B2 | 8/2011 | Todd | |
| 8,091,638 B2 | 1/2012 | Dusterhoft et al. | |
| 8,101,556 B2 | 1/2012 | Norman et al. | |
| 8,181,703 B2 | 5/2012 | Sierra et al. | |
| 8,215,393 B2 | 7/2012 | MacKay et al. | |
| 2004/0220058 A1 | 11/2004 | Eoff et al. | |
| 2005/0284632 A1 | 12/2005 | Dalrymple et al. | |
| 2006/0266522 A1 | 11/2006 | Eoff et al. | |
| 2007/0012445 A1 | 1/2007 | Nguyen et al. | |
| 2007/0029087 A1 | 2/2007 | Nguyen et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2010/0216672 A1 | 8/2010 | Todd | |
| 2011/0034351 A1* | 2/2011 | Eoff et al. | 507/212 |
| 2011/0092396 A1 | 4/2011 | Cliffe | |

FOREIGN PATENT DOCUMENTS

WO 2013173564 A1 11/2013

OTHER PUBLICATIONS

Ramirez et al., ACIPET, "Another Way to Control Water-Based Fluid Loss—Colombia Case Histories," 2011.
Weaver et al., "Hydrophobic Filming Reduces Frac Gel and Mineral Scale Damage," SPE 138314, 2010.
International Search Report and Written Opinion for PCT/US2013/041314 dated Jul. 12, 2013.

* cited by examiner

*Primary Examiner* — Alicia Bland
(74) *Attorney, Agent, or Firm* — McDermott Will & Emery LLP; Holly Soehnge

(57) ABSTRACT

Methods of stabilizing water-sensitive clays in subterranean formations may include introducing a drill-in treatment fluid into at least a portion of a subterranean formation comprising water-sensitive minerals, where providing the drill-in treatment fluid comprises an aqueous-based fluid and a hydrophobically-modified cationic polymer; and allowing the hydrophobically-modified cationic polymer to at least partially coat the water-sensitive mineral.

20 Claims, No Drawings

METHODS FOR STABILIZING WATER-SENSITIVE CLAYS

BACKGROUND

The present invention relates to methods of stabilizing water-sensitive clays in subterranean formations.

The recovery of fluids, especially hydrocarbon fluids, from subterranean formations may be complicated by formations that contain water-sensitive minerals capable of undergoing chemical and physical changes, e.g., minerals that swell, slough, degrade, release fines, or become ductile, when contacted with water. The chemical and physical changes to the minerals often result in the blockage and/or closure of passageways that penetrate the subterranean formation (e.g., fracture network, pore throats, etc.), thereby causing a loss in permeability of the formation. This loss in permeability impairs the flow of fluid through the wellbore and, in some cases, may even completely block the flow of fluids through portions of the formation. Loss in permeability often leads to a decrease in the production for the well. Moreover, some changes in the minerals may lead to sloughing, which yields fines capable of migrating and being produced with the formation fluids, thereby presenting potential abrasion and other problems with the production equipment and potential reduction in fracture conductivity.

One method to mitigate damage to water-sensitive minerals has included the use of cationic chemicals. Cationic chemicals are thought to, inter alia, adsorb to the negatively charged surface of some water-sensitive minerals, which to some extent blocks the water from reacting with the water-sensitive mineral. However, the resultant surface is then rendered hydrophilic, which can inhibit the flow of hydrophobic fluids like hydrocarbons. Some have attempted to provide for a more hydrophobic surface through the use of cationic surfactants. However, the surfactants may readily wash off the surface of the water-sensitive minerals in subsequent subterranean operations, e.g., acidizing or fracturing. Therefore, large quantities and multiple treatments throughout the lifetime of a wellbore may be necessary, which can dramatically increase the cost and time associated with producing fluids from the subterranean formation.

SUMMARY OF THE INVENTION

The present invention relates to methods of stabilizing water-sensitive clays in subterranean formations.

Some embodiments of the present invention provide for a method that includes providing a drill-in treatment fluid that comprises an aqueous-based fluid and a hydrophobically-modified cationic polymer; introducing the drill-in treatment fluid into at least a portion of a subterranean formation comprising water-sensitive minerals; and allowing the hydrophobically-modified cationic polymer to at least partially coat the water-sensitive mineral.

In other embodiments, the present invention provides a method that includes providing a treatment fluid that comprises an aqueous-based fluid and a hydrophobically-modified cationic polymer; introducing the treatment fluid into at least a portion of a subterranean formation comprising water-sensitive minerals; and allowing the hydrophobically-modified cationic polymer to at least partially coat the water-sensitive mineral.

In still other embodiments, the present invention provides a method that includes introducing the drill-in treatment fluid into at least a portion of a subterranean formation comprising water-sensitive minerals, the drill-in treatment fluid comprising a first aqueous-based fluid and a first hydrophobically-modified cationic polymer; allowing the first hydrophobically-modified cationic polymer to at least partially coat the water-sensitive mineral; then introducing a fracturing treatment fluid into at least the portion of the subterranean formation comprising water-sensitive minerals having been treated with the first hydrophobically-modified cationic polymer at a pressure sufficient to create or extend at least one fracture in the subterranean formation, the fracturing fluid comprising a second aqueous-based fluid, and a second hydrophobically-modified cationic polymer; and allowing the second hydrophobically-modified cationic polymer to at least partially coat the water-sensitive mineral.

The features and advantages of the present invention will be readily apparent to those skilled in the art upon a reading of the description of the preferred embodiments that follows.

DETAILED DESCRIPTION

The present invention relates to methods of stabilizing water-sensitive clays in subterranean formations.

The present invention may advantageously provide for, in some embodiments, methods for mitigating damage to water-sensitive minerals in subterranean formation while providing a hydrophobic surface for hydrocarbons and other hydrophobic fluids to interact with by employing hydrophobically-modified cationic polymers. Said hydrophobically-modified cationic polymers may provide for several points of attachment to the water-sensitive minerals, thereby, in some embodiments providing for a long-lasting or essentially permanent protection of water-sensitive minerals that is not readily removed by washing or flowing through the formation with acids, bases, organic, or aqueous fluids.

In some embodiments, suitable subterranean formations that may be advantageously treated with the methods of the present invention may include, but not be limited to, formations that comprise water-sensitive minerals (e.g., water-sensitive clays, tight gas formations, shales, and coal beds). Generally, water-sensitive minerals include minerals that, when contacted by aqueous fluids in disequilibrium with the minerals in the formation, tend to swell and/or migrate. The water-sensitive mineral content of the formations may be a single species of a water-sensitive mineral or several species, including, but not limited to, the mixed-layer types of clay. Specifically, subterranean formations may include minerals like, but not limited to, silica; iron minerals; alkaline earth metal carbonates, feldspars, biotite, illite, and chlorite; smectite clays such as montmorillonite, beidellite, nontronite, saponite hectorite and sauconite; kaolin clays such as kaolinite, nacrite, dickite, endellite and halloysite; illite clays such as hydrobiotite, glauconite and illite; chlorite clays such as chlorite, greenalite and chamosite; other clay minerals not belonging to the above groups such as vermiculite, palygorskite, sepiolite; mixed-layer (both regular and irregular) varieties of the above minerals; and any combination thereof.

Some embodiments of the present invention may involve treating at least a portion of a subterranean formation comprising water-sensitive minerals with hydrophobically-modified cationic polymers. In some embodiments, the hydrophobically-modified cationic polymer may coat at least a portion of the water-sensitive minerals. As used herein, the terms "coat" or "coating," and the like, does not imply any particular degree of surface coverage. In particular, the terms "coat" or "coating" do not imply 100% surface coverage.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, treatment of the water-sensitive minerals may advantageously occur during early-stage treatment operations within a subterranean formation. As used herein, the term "early-stage treatment operations," and the like, refers to an operation in a subterranean formation where the fluid of the operation is a non-native fluid placed into the subterranean formation before the native water-sensitive materials have been significantly swelled or migrated. Generally, early-stage treatment operations involve the first few fluids placed in the subterranean formation. Suitable early-stage treatment operations may include, but are not limited to, drilling operations, drill-in operations, gravel packing operations, hydraulic fracturing operations, frac-packing operations, acidizing operations, stabilizing operations, and the like. By way of nonlimiting example, a gravel packing operation may utilize a treatment fluid comprising an aqueous-based fluid, hydrophobically-modified cationic polymers, and gravel particulates. Accordingly, some embodiments may involve introducing a treatment fluid comprising an aqueous-based fluid, hydrophobically-modified cationic polymers, and gravel particulates into a wellbore, placing the gravel particles in an annulus between a screen and the wellbore so as to form a gravel pack, and allowing the hydrophobically-modified cationic polymers to coat at least a portion of water-sensitive minerals in at least a close proximity to the gravel pack.

In some embodiments, early-stage treatment fluids may comprise an aqueous-based fluid and hydrophobically-modified cationic polymers. Some embodiments of the present invention may involve introducing early-stage treatment fluids into the subterranean formation at a pressure sufficient to create or extend at least one fracture in the subterranean formation. By way of nonlimiting example, a fracturing fluid comprising hydrophobically-modified cationic polymers and an aqueous-based fluid may be introduced into the subterranean formation, e.g., via a wellbore penetrating the subterranean formation, at a pressure sufficient to create or extend at least one fracture within the subterranean formation.

In some embodiments, hydrophobically-modified cationic polymer may be included in more than one early-stage treatment fluid. By way of a nonlimiting example, a drill-in fluid comprising an aqueous-based fluid and hydrophobically-modified cationic polymers may be introduced into a subterranean formation, and then a fracturing fluid comprising hydrophobically-modified cationic polymers and an aqueous-based fluid may be introduced into the subterranean formation at a pressure sufficient to create or extend at least one fracture within the subterranean formation. In some embodiments, the hydrophobically-modified cationic polymers and/or the aqueous-based fluid of multiple early-stage treatment fluids may independently be the same or different.

In some embodiments, hydrophobically-modified cationic polymers for use in conjunction with the present invention may comprise a cationic polymer having a plurality of hydrophobic modifications. Suitable cationic polymers for use in conjunction with the present invention may include, but are not limited to, a quaternary ammonium salt of polydialkyldiallyl polymers, a quaternary ammonium salt of polyethyleneimine polymers, a quaternary ammonium salt of polydimethylaminoethyl-methacrylate copolymers, a quaternary ammonium salt of polyN-(3-dimethylaminopropyl)acrylamide polymers, poly(dimethyldiallylammonium chloride), cationic co-polymers of poly(acrylamide), cationic poly(diemethylaminoethylmethacrylate), and the like, or any combination thereof.

Suitable hydrophobic modifications to a cationic polymer may include, but are not limited to, linear $C_5$-$C_{18}$ hydrocarbons, branched $C_5$-$C_{18}$ hydrocarbons, $C_5$-$C_{18}$ hydrocarbons comprising an aromatic group, $C_5$-$C_{18}$ hydrocarbons comprising a cyclic group, $C_5$-$C_{18}$ hydrocarbons comprising at least one heteroatom, $C_5$-$C_{18}$ hydrocarbons comprising an ionic group, $C_5$-$C_{18}$ hydrocarbons comprising at least one unsaturated bond, any hybrid thereof, and any combination thereof. Suitable ionic groups may include, but are not limited to, carboxyls, carbonyls, ketos, hydroxyls, carbinols, acetals, alkoxys, alkepoxys, esters, amides, amines, imines, imides, sulfos, cationic salts, other nitrogen groups, similar sulfur groups, or any combination thereof. Suitable heteroatoms may include, but are not limited to, oxygen, sulfur, nitrogen, phosphorous, halogens, or any combination thereof. By way of nonlimiting example, a suitable hydrophobically-modified cationic polymer may be a poly(dimethyldiallylammonium chloride) with a $C_{11}$ linear chain replacing one of the methyl groups of the dimethyldiallylammonium chloride monomeric units.

In some embodiments, hydrophobically-modified cationic polymers for use in conjunction with the present invention may have a degree of hydrophobic modification of about 1 hydrophobic modification for about 5 to about 25 monomer units of the cationic polymer, including any subset therebetween.

In some embodiments, hydrophobically-modified cationic polymers for use in conjunction with the present invention may have a molecular weight ranging from a lower limit of about 900 g/mol, 2,500 g/mol, 10,000 g/mol, 50,000 g/mol, 100,000 g/mol, or 500,000 g/mol to an upper limit of about 5,000,000 g/mol, 1,000,000 g/mol, 500,000 g/mol, 100,000 g/mol, or 50,000 g/mol, and wherein the molecular weight may range from any lower limit to any upper limit and encompass any subset therebetween. In some embodiments, the hydrophobic modifications of the cationic polymer may account for about 2% to about 25% of the molecular weight of the hydrophobically-modified cationic polymer, including any subset therebetween (e.g., about 5% to about 20%).

In some embodiments, early-stage treatment fluids may comprise hydrophobically-modified cationic polymer at a concentration from an upper limit of about 0.01%, 0.1%, 1%, or 5% to an upper limit of about 25%, 10%, or 5% weight by volume of the early-stage treatment fluid, and wherein the concentration may range from any lower limit to any upper limit and encompass any subset therebetween.

In some embodiments, aqueous-based fluids for use in conjunction may comprise aqueous fluids, aqueous-miscible fluids, or any combination thereof. In some embodiments, aqueous fluids suitable for use in conjunction with the present invention may comprise fresh water, saltwater (e.g., water containing one or more salts dissolved therein), brine (e.g., saturated salt water), seawater, or any combination thereof. Examples of suitable brines may include, but are not necessarily limited to, heavy brines, monovalent brines, divalent brines, and trivalent brines that comprise soluble salts like sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, any combination thereof, and any derivative thereof. Generally, the water may be from any source, provided that it does not contain components that might adversely affect the stability and/or performance of the first treatment fluids or second treatment fluids of the present invention. In certain embodiments, the density of the aqueous-based fluid can be adjusted, among other purposes, to provide additional particulate transport and suspension in the treatment fluids used in the methods of the present invention. In certain embodiments, the pH of the aqueous-based fluid may be adjusted (e.g., by a buffer or other pH adjusting agent), among other purposes, to activate a crosslinking agent and/or to reduce the viscosity of a treatment fluid (early-stage or otherwise) (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

In some embodiments, early-stage treatment fluids suitable for use in conjunction with the present invention may comprise aqueous-miscible fluids, e.g., alcohols, glycerin, glycols, polyglycol amines, polyols, any derivative thereof, or any combination thereof. Examples of suitable alcohols may include, but are not necessarily limited to, methanol, ethanol, propanol, iso-propanol, butanol, tert-butanol, and the like. Examples of suitable glycols may include, but are not necessarily limited to, polyglycols, propylene glycol, ethylene glycol, and the like.

In some embodiments, the aqueous-based fluid for use in conjunction with the present invention may be foamed. In some embodiments, early-stage treatment fluids for use in conjunction with the present invention may comprise hydrophobically-modified cationic polymers, an aqueous-based fluid, a gas, and a foaming agent.

Suitable gases for use in conjunction with the present invention may include, but are not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality of the foamed treatment fluid may range from a lower limit of about 5%, 10%, 25%, 40%, 50%, 60%, or 70% gas volume to an upper limit of about 99%, 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 99%, or about 95% to about 98%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, early-stage treatment fluids for use in conjunction with the present invention may optionally further comprise viscosifiers, viscoelastic surfactants, fluid loss control additives, bridging agents, degradable bridging agents, proppant particulates, additional additives, or any combination thereof.

Suitable viscosifiers for use in conjunction with the present invention may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, succinoglycan, scleroglucan, diutan, and combinations thereof. In some embodiments, viscosifiers may be included in early-stage treatment fluids for use in conjunction with the present invention at a concentration of about 0.01% to about 0.6% by weight of the early-stage treatment fluid.

Suitable fluid loss control additives for use in conjunction with the present invention may include, but are not limited to, starches, starch ether derivatives, hydroxyethylcellulose, crosslinked hydroxyethylcellulose, and the like, or any combination thereof. In some embodiments, fluid loss control additives may be included in early-stage treatment fluids for use in conjunction with the present invention at a concentration of about 0.01% to about 3% by weight of the early-stage treatment fluid.

Suitable bridging agents for use in conjunction with the present invention may include, but are not limited to, latex polymers, calcium carbonate, dolomite, celluloses, sand, ceramic particles, silica, alumina, fumed carbon, carbon black, graphite, mica, titanium dioxide, meta-silicate, calcium silicate, kaolin, talc, zirconia, boron, fly ash, hollow glass microspheres, solid glass, degradable polymers (e.g., aliphatic polyesters, poly(lactides), poly(glycolides), poly(ε-caprolactones), poly(hydroxy ester ethers), poly(hydroxybutyrates), poly(anhydrides), polycarbonates, poly(orthoesters), poly(amino acids), poly(ethylene oxides), poly(phosphazenes), poly(ether esters), polyester amides, polyamides, and copolymers or blends of any of these degradable polymers, and derivatives of these degradable polymers), and the like, or any combination thereof. In some embodiments, degradable polymers may be used in conjunction with dehydrated compounds (e.g., anhydrous sodium tetraborate and anhydrous boric acid). In some embodiments, bridging agents may be included in early-stage treatment fluids for use in conjunction with the present invention at a concentration of about 0.01% to about 3% by weight of the early-stage treatment fluid.

Suitable proppant particulates for use in conjunction with the present invention may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size of proppant particulates generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention. In some embodiments, propping agents may be included in early-stage treatment fluids for use in conjunction with the present invention at a concentration of about 0.5 pounds per gallon ("ppg") to about 30 ppg by volume of the early-stage treatment fluid.

Suitable additional additives may include, but are not limited to, salts, weighting agents, inert solids, emulsifiers, dispersion aids, corrosion inhibitors, emulsion thinners, emulsion thickeners, gelling agents, surfactants, particulates, gravel particulates, lost circulation materials, pH control additives, breakers, biocides, crosslinkers, stabilizers, chelating agents, scale inhibitors, gas hydrate inhibitors, oxidizers, reducers, friction reducers, clay stabilizing agents, or any combination thereof.

Some embodiments of the present invention may involve introducing early-stage treatment fluids into a portion of a subterranean formation comprising water-sensitive minerals and allowing the hydrophobically-modified cationic polymer to at least partially coat the water-sensitive minerals.

Some embodiments of the present invention may involve introducing early-stage treatment fluids into a portion of a subterranean formation comprising water-sensitive minerals and allowing the hydrophobically-modified cationic polymer to at least partially coat the water-sensitive minerals.

Some embodiments may involve introducing early-stage treatment fluids into a portion of a subterranean formation comprising water-sensitive minerals; allowing the hydrophobically-modified cationic polymer to at least partially coat the water-sensitive minerals; and producing hydrocarbons from the portion of the subterranean formation having water-sensitive minerals at least partially coated with hydrophobically-modified cationic polymer.

Some embodiments may involve introducing early-stage treatment fluids into a portion of a subterranean formation comprising water-sensitive minerals; allowing the hydrophobically-modified cationic polymer to at least partially coat the water-sensitive minerals; and performing at least one additional treatment operation to the subterranean formation after the water-sensitive minerals have been treated with the hydrophobically-modified cationic polymer. Suitable treatment operations subsequent to an early-stage operation may include, but are not limited to, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. The methods and compositions of the present invention may be used in full-scale operations or pills. As used herein, a "pill" is a type of relatively small volume of specially prepared treatment fluid placed or circulated in the wellbore.

In some embodiments, treatment operations subsequent to an early-stage operation may optionally include a hydrophobically-modified cationic polymer according to any embodiments described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined hereinto mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a drill-in treatment fluid that comprises an aqueous-based fluid and a hydrophobically-modified cationic polymer, wherein the cationic polymer comprises a quaternary ammonium salt of a polyethyleneimine polymer and wherein the hydrophobic modification on said polyethyleneimine polymer comprises a $C_5$-$C_{18}$ hydrocarbon comprising an aromatic group;
introducing the drill-in treatment fluid into at least a portion of a subterranean formation comprising water-sensitive minerals; and
allowing the hydrophobically-modified cationic polymer to at least partially coat the water-sensitive mineral.

2. The method of claim 1, wherein the cationic polymer has a degree of hydrophobic modification of about 1 hydrophobic modification for about 5 to about 25 monomer units of the cationic polymer.

3. The method of claim 1, wherein the hydrophobic modification accounts for about 2% to about 25% of the molecular weight of the hydrophobically-modified cationic polymer.

4. The method of claim 1, wherein the treatment fluid further comprises a second hydrophobically-modified cationic polymer, the second cationic polymer is selected from the group consisting of polydialkyldiallyl polymers, a quaternary ammonium salt of polydimethylaminoethyl-methacrylate copolymers, a quaternary ammonium salt of polyN-(3-dimethylaminopropyl)acrylamide polymers, poly(dimethyldiallylammonium chloride), cationic co-polymers of poly(acrylamide), cationic poly(diemethylaminoethyl-methacrylate), and any combination thereof.

5. The method of claim 4, wherein the hydrophobic modifications of the second hydrophobically modified cationic polymer comprise at least one selected from the group consisting of a linear $C_5$-$C_{18}$ hydrocarbon, a branched $C_5$-$C_{18}$ hydrocarbon, a $C_5$-$C_{18}$ hydrocarbon comprising an aromatic group, a $C_5$-$C_{18}$ hydrocarbon comprising a cyclic group, a $C_5$-$C_{18}$ hydrocarbon comprising at least one heteroatom, a $C_5$-$C_{18}$ hydrocarbon comprising an ionic group, a $C_5$-$C_{18}$ hydrocarbon chain comprising at least one unsaturated bond, any hybrid thereof, and any combination thereof.

6. The method of claim 5, wherein the ionic group comprises at least one selected from the group consisting of a carboxyl, a carbonyl, a keto, a hydroxyl, a carbinol, an acetal, an alkoxy, an alkepoxy, an ester, an amide, an amine, an imine, an imide, a sulfo, a cationic salt, a similar sulfur group, and any combination thereof.

7. The method of claim 5, wherein the heteroatom is at least one selected from the group consisting of an oxygen, a sulfur, a nitrogen, a phosphorous, a halogen, and any combination thereof.

8. The method of claim 1, wherein the hydrophobically-modified cationic polymer has a molecular weight of about 900 to about 50,000,000.

9. The method of claim 1, wherein the hydrophobically-modified cationic polymer has a concentration of about 0.01% to about 25% weight by volume of the drill-in treatment fluid.

10. The method of claim 1, wherein the drill-in treatment fluid further comprises at least one selected from the group consisting of a viscosifier, a fluid loss control additive, a bridging agent, a degradable bridging agent, a foamed fluid, a salt, a weighting agent, an inert solid, an emulsifier, a dispersion aid, a corrosion inhibitor, an emulsion thinner, an emulsion thickener, a gelling agent, a surfactant, a particulate, a gravel particulate, a lost circulation material, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

11. A method comprising:
providing a treatment fluid that comprises an aqueous-based fluid, and a hydrophobically-modified cationic polymer, wherein the cationic polymer comprises a quaternary ammonium salt of a polyethyleneimine polymer and wherein the hydrophobic modification on said polyethyleneimine polymer comprises a $C_5$-$C_{18}$ hydrocarbon comprising an aromatic group;
introducing the treatment fluid into at least a portion of a subterranean formation comprising water-sensitive minerals; and
allowing the hydrophobically-modified cationic polymer to at least partially coat the water-sensitive mineral.

12. The method of claim 11, wherein the treatment fluid is a fracturing fluid and is introduced into the portion of the subterranean formation at a pressure sufficient to create or extend at least one fracture in the subterranean formation.

13. The method of claim 11, wherein the treatment fluid is a gravel packing fluid and further comprises gravel particles.

14. The method of claim 11, wherein the cationic polymer has a degree of hydrophobic modification of about 1 hydrophobic modification for about 5 to about 25 monomer units of the cationic polymer.

15. The method of claim 11, wherein the hydrophobic modification accounts for about 2% to about 25% of the molecular weight of the hydrophobically-modified cationic polymer.

16. The method of claim 11, wherein the treatment fluid further comprises a second hydrophobically-modified cationic polymer, the second cationic polymer is selected from the group consisting of polydialkyldiallyl polymers, a quaternary ammonium salt of polydimethylaminoethyl-methacrylate copolymers, a quaternary ammonium salt of polyN-(3-dimethylaminopropyl)acrylamide polymers, poly(dimethyldiallylammonium chloride), cationic co-polymers of poly(acrylamide), cationic poly(diemethylaminoethyl-methacrylate), and any combination thereof.

17. The method of claim 16, wherein the hydrophobic modifications of the second hydrophobically modified cationic polymer comprise at least one selected from the group consisting of a linear $C_5$-$C_{18}$ hydrocarbon, a branched $C_5$-$C_{18}$ hydrocarbon, a $C_5$-$C_{18}$ hydrocarbon comprising an aromatic group, a $C_5$-$C_{18}$ hydrocarbon comprising a cyclic group, a $C_5$-$C_{18}$ hydrocarbon comprising at least one heteroatom, a $C_5$-$C_{18}$ hydrocarbon comprising an ionic group, a $C_5$-$C_{18}$ hydrocarbon chain comprising at least one unsaturated bond, any hybrid thereof, and any combination thereof.

18. The method of claim 11, wherein the hydrophobically-modified cationic polymer has a molecular weight of about 900 to about 50,000,000.

19. The method of claim 11, wherein the hydrophobically-modified cationic polymer has a concentration of about 0.01% to about 25% weight by volume of the treatment fluid.

20. A method comprising:
introducing the drill-in treatment fluid into at least a portion of a subterranean formation comprising water-sensitive minerals, the drill-in treatment fluid comprising a first aqueous-based fluid and a first hydrophobically-modified cationic polymer, wherein the cationic polymer comprises a quaternary ammonium salt of a polyethyleneimine polymer and wherein the hydrophobic modification on said polyethyleneimine polymer comprises a $C_5$-$C_{18}$ hydrocarbon comprising an aromatic group;
allowing the first hydrophobically-modified cationic polymer to at least partially coat the water-sensitive mineral;
then introducing a fracturing treatment fluid into at least the portion of the subterranean formation comprising water-sensitive minerals having been treated with the first hydrophobically-modified cationic polymer at a pressure sufficient to create or extend at least one fracture in the subterranean formation, the fracturing fluid comprising a second aqueous-based fluid, and a second hydrophobically-modified cationic polymer; and
allowing the second hydrophobically-modified cationic polymer to at least partially coat the water-sensitive mineral.

* * * * *